United States Patent
Wilkerson, Jr. et al.

[15] 3,652,296
[45] Mar. 28, 1972

[54] PROCESS FOR PREPARING SAUSAGE PRODUCT AND PRODUCTS

[72] Inventors: Forrest R. Wilkerson, Jr.; George M. McClancy, both of Charlotte, N.C.

[73] Assignee: Remac, Inc., Charlotte, N.C.

[22] Filed: Sept. 4, 1969

[21] Appl. No.: 855,373

[52] U.S. Cl. .................................... 99/109, 99/107, 99/108, 99/146, 99/157
[51] Int. Cl. ........................................ A22c 11/00, A23b 1/00
[58] Field of Search .................... 99/107, 109, 143, 146, 157, 99/159, 108, 222, 140

[56] References Cited

UNITED STATES PATENTS

| | | | |
|---|---|---|---|
| 2,360,374 | 10/1944 | Topjian | 99/159 |
| 2,621,128 | 12/1952 | Webb et al. | 99/146 |
| 3,245,808 | 4/1966 | Farkas et al. | 99/159 X |
| 2,054,646 | 9/1936 | Allen | 99/222 |
| 3,434,843 | 3/1969 | Durst | 99/107 X |

OTHER PUBLICATIONS

Hunt et al., " Honey and its Uses in the Home," p. 11, April 7, 1915, U.S. Dept. of Agriculture, Farmer's Bulletin 653.
Roberson, " The Meat Cookbook" 1953, Published by Henry Holt and Co. New York, Page 173, Article entitled Very Special Pork Pie.

*Primary Examiner*—Hyman Lord
*Attorney*—Channing L. Richards, Dalbert U. Shefte, Francis M. Pinckney and Richards & Shefte

[57] ABSTRACT

A composition for use with fresh meat, the composition including 1 to 8 parts of fresh honey in its natural state evenly blended with 100 parts of a dry granular carrier such as sodium chloride, and also including suitable dry spices and other general additives. When the composition is interspersed through the meat, as in pork sausage, for example, the fresh honey acts to retard spoilage and discoloration of the meat. A process for forming the composition includes preheating the sodium chloride to approximately 120° F., preheating the honey to approximately 90° F., continuously agitating the preheated sodium chloride while gradually and evenly pouring the honey thereinto, after which the dry spices and other additives may also be blended into this mixture.

5 Claims, No Drawings

PROCESS FOR PREPARING SAUSAGE PRODUCT AND PRODUCTS

BACKGROUND OF THE INVENTION

Fresh meats are, of course, subject to contamination as a result of oxidating rancidity, and decomposition produced by micro-organisms or bacteria formed in the meat. This problem of contamination and decomposition is even more acute in prepared meats such as pork sausage in which the meat is initially ground into small particles that present greater surface exposure, and in which the seasoning mixture itself increases the decomposition forming bacteria in the meat product.

The problem of oxidation rancidity has been largely alleviated by known additives of the fat-soluble type (i.e., hydroxy anisole) and the water-soluble type (i.e., ascorbic acid), but the antioxidant additives apparently have no appreciable effect on reducing the decomposition bacteria in the meat.

In the development of the present invention, it has been found that this undesirable decomposition and discoloration of fresh meat can be substantially retarded by exposing the meat to fresh honey in its natural state, particularly in prepared meats such as pork sausage.

Fresh honey is, of course, a natural substance which has many known uses as a sweetening agent in connection with other good products as, for example, in bakery products as described in U.S. Pat. No. 2,693,420, issued Nov. 2, 1954; or in modifying the taste of other ingredients in salads, for example, as described in U.S. Pat. No. 2,221,957, issued Nov. 19, 1940. Also, it is known that "cooked" or dehydrated honey has heretofore been used as a flavor enhancer in sausage products, dehydrated honey being used because it is in a dry crystalline form that is conducive to mixing in the sausage meat. However, the beneficial preservative results obtained by the present invention with fresh honey cannot be obtained with dehydrated honey, apparently because the heating process associated with dehydration of the honey renders the final product passive insofar as preventing contamination of meat is concerned.

Accordingly, so far as we are aware, fresh honey has heretofore never been combined with fresh meat in a manner which increases the color stability and shelf life of the meat, nor has this beneficial preservative feature of honey ever been formally recognized.

SUMMARY OF THE INVENTION

The marked increase in shelf life and color stability of fresh meat by the addition of a sufficient quantity of fresh honey thereto in accordance with the present invention is believed to be attributable to the fact that fresh honey causes some enzymatic process within the meat that acts to arrest decomposition while maintaining a proper color for the meat. The exact reason that this beneficial result is obtained is not entirely clear; however, test results indicate quite clearly that the decomposing bacteria count in fresh meat is substantially reduced when fresh honey is added thereto, and it has been definitely determined that the shelf life of a highly seasoned prepared meat product such as pork sausage can be increased by 5 to 7 days at normal storage temperatures.

Since fresh honey has a viscid consistency, it does not ordinarily mix readily with other solid or granular ingredients and may be difficult to introduce into a fresh meat with uniformity. Accordingly, the present invention provides for mixing the fresh honey with an edible carrier to form a generally dry mixture which retains the fresh honey in its natural state, yet which can be mixed uniformly with fresh meat, preferably as a condimental seasoning such as used with pork sausage. Such a mixture preferably includes 1 to 8 parts of honey distributed uniformly with 100 parts of sodium chloride. To this basic mixture may be added additional condiments such as sugar, pepper, sage and other common additives.

The present invention also provides a process which facilitates blending the fresh honey with the dry carrier, this process including preheating the carrier (i.e., sodium chloride) and the honey to elevated temperatures below the "cooking" temperature for fresh honey, constantly agitating the preheated carrier while gradually and evenly pouring the fresh honey into the agitated carrier, and then, if desired, pouring other dry spices into the basic mixture after it has become thoroughly blended.

DESCRIPTION OF THE PREFERRED EMBODIMENT

Typically, pork sausage combines 50 lbs. of fresh, ground pork meat with 1 lb. of a preblended seasoning mixture of selected condiments (and additives) that results in the sausage having a desired taste. While the ingredients and the proportionate quantities thereof vary to suit the particular taste of the sausage producer, the following example provides a representative mixture:

| Ingredient | Parts by weight |
| --- | --- |
| Sodium chloride | 100 lbs. |
| Rubbed sage | 6 lbs. |
| Ground red pepper | 5 lbs. |
| Crushed red pepper | 4½ lbs. |
| Sugar | 4 lbs. |
| Monosodium glutamate | 4 lbs. |
| Black pepper | 3 lbs. |

In accordance with the present invention, 4 to 8 lbs. of fresh honey are preferably added to the above mixture since this quantity of fresh honey appears to provide the maximum benefit in preserving the pork sausage when the seasoning mixture is added thereto. Of course, a lesser quantity of fresh honey could be added at some sacrifice to the preservative results obtained, or more fresh honey could be added, if desired, for flavor purposes, but no appreciable increase in the preservative results appears to obtain from this increase in fresh honey.

In tests conducted to compare pork sausage uniformly blended with a seasoning mixture that includes fresh honey to the same sausage blended with an identical seasoning mixture without fresh honey, the following results were recorded after 48 hours:

| Sample | Standard Plate Count |
| --- | --- |
| 1. Seasoning mixture without fresh honey | 2,100,000 colonies per gram |
| 2. Seasoning mixture with fresh honey | 900,000 colonies per gram |

Thus, it is apparent that the bacteria count in the pork sausage is substantially reduced by the inclusion of fresh honey in the seasoning mixture.

It is believed that fresh honey which has been heated to a "cooking" temperature of 170° F. or more, as during a dehydration process, for example, no longer possesses the properties which reduce the decomposing bacteria in meat. Accordingly, the present invention utilizes fresh honey in its natural state, extracted from its honeycomb without the application of heat as by placing the honeycomb in a centrifuge at room temperature to centrifugally separate the honey therefrom.

As previously mentioned, the viscid consistency of fresh honey in its natural state makes it difficult to intersperse a comparatively small quantity of the honey uniformly throughout the meat product since the honey tends to collect in concentrated globules rather than to spread out thinly. Likewise, if fresh honey is simply poured into a seasoning mixture composed, as indicated above, of a number of dry condiments such as salt, pepper, etc., the honey tends to form relatively large, sticky globules to which a relatively small proportion of the dry condiments attach at the outer surface of the globules. Obviously, a seasoning mixture in this condition cannot be uniformly distributed throughout a meat product such as pork sausage in the same way that a normally dry seasoning mixture can.

Therefore, the present invention provides for combining a relatively small quantity of fresh honey with a relatively large quantity of an edible carrier to form a generally dry mixture which can be readily distributed uniformly throughout a prepared meat such as pork sausage. Since most prepared meats of this sort have added thereto a seasoning mixture that includes a large quantity of sodium chloride as a basic ingredient, this sodium chloride can be used to provide an excellent carrier for the fresh honey if these two ingredients are mixed properly.

As indicated above, it is not feasible to simply pour the honey into the sodium chloride and obtain a dry mixture with the honey uniformly distributed throughout the sodium chloride. However, in accordance with the present invention, it has been found that if a relatively small quantity of fresh honey is gradually and evenly added to sodium chloride as the latter is being constantly agitated, a mixture results in which the honey is uniformly distributed throughout the sodium chloride, and this mixture is generally dry and differs in this respect only slightly from the sodium chloride before the honey was blended therewith. This process can be carried out by placing a large quantity of sodium chloride (i.e., 50 lbs.) in a ribbon blender which is then energized to cause continuous agitation of the sodium chloride and to separate any sodium chloride granules which may have joined together as lumps. As the sodium chloride is being agitated, a relatively small quantity (i.e., 1 to 8 pounds) of fresh honey is poured into the blender by moving the honey container continuously along the blender so that the fresh honey is gradually and evenly blended with the sodium chloride. It has been found that this blending process is greatly facilitated by preheating the sodium chloride to an elevated temperature of approximately 120° F. before the fresh honey is added thereto, and even better results are obtained if the fresh honey is also preheated to a temperature of approximately 90° F. prior to blending. It is believed that this preheating of the honey causes it to become thinner, and that the preheating of the sodium chloride maintains this thinning effect, or causes it to some extent, as the fresh honey comes into contact with the individual granules of sodium chloride whereby the fresh honey tends to distribute itself more uniformly over the surfaces of the sodium chloride granules. In any event, this mixture of sodium chloride and fresh honey blended in this manner is essentially dry to the touch.

It should be noted that in preheating the sodium chloride and/or the fresh honey, the ultimate temperature of the fresh honey should be less than the temperature at which honey is "cooked" (i.e., 170° F.) because such cooking may destroy the preservative quality of the honey as mentioned previously.

After the fresh honey and sodium chloride have become thoroughly blended as described, the other condiments such as ground pepper, etc., are added by pouring them evenly into the sodium chloride and honey mixture as it is being agitated. These additional condiments likewise distribute themselves relatively uniformly throughout the mixture, and they tend to collect somewhat on the individual sodium chloride granules which are evenly coated with a layer of honey. The end result is a dry, powdery mixture which can be quite readily added to ground pork or the like to form a sausage product.

Also, it should be noted that the physical makeup of the blended seasoning composition of the present invention also contributes to the effective preservation of the meat product with which it is used. It is known that sodium chloride reacts with fresh meat upon contact therewith in a manner which tends to preserve the meat for a longer period of time than if no sodium chloride were present. By coating the individual granules of sodium chloride with fresh honey, and then further coating the fresh honey with other granular condiments, the sodium chloride granules become somewhat encapsulated and, consequently, the reaction between these granules and the fresh meat is less direct than with sodium chloride alone. This results in the preservative feature of the sodium chloride being spread out over a longer period of time rather than acting all at once when the sodium chloride is first added to the fresh meat as is normally the case.

It is to be understood that this disclosure is for purposes of illustration only and that various changes and modifications may be made without departing from the spirit and scope of the invention.

We claim:

1. A process for preparing a composition which can be readily distributed uniformly throughout fresh ground meat to preserve and season the same comprising heating a relatively large quantity of an edible dry carrier at an elevated temperature less than 170° F., and continuously agitating the heated carrier while gradually and evenly blending therewith a relatively small quantity of fresh honey in its natural state to form a generally dry mixture in which the fresh honey is uniformly distributed.

2. A process as defined in claim 1 and further characterized by the step of uniformly interspersing said dry mixture of blended carrier and fresh honey throughout ground sausage.

3. A process as defined in claim 1 and further characterized in that said edible dry carrier is sodium chloride.

4. A process as defined in claim 3 and further characterized in that the sodium chloride is preheated to a temperature of 120° F., in that the honey is preheated to a temperature of 90° F. before it is added to the preheated sodium chloride, and in that 1 to 8 parts of honey are mixed with 100 parts of sodium chloride.

5. A sausage product formed by the process defined in claim 2.

* * * * *